Oct. 16, 1928.  
J. R. LITTY ET AL  
FILLING MACHINE  
Filed March 19, 1927    6 Sheets-Sheet 3

1,687,944

WITNESSES:

INVENTORS:
John R. Litty &
Trued B. Lundin,
BY
Joshua R.H. Toth
ATTORNEY

Oct. 16, 1928.  
J. R. LITTY ET AL  
FILLING MACHINE  
Filed March 19, 1927  
1,687,944  
6 Sheets-Sheet 4
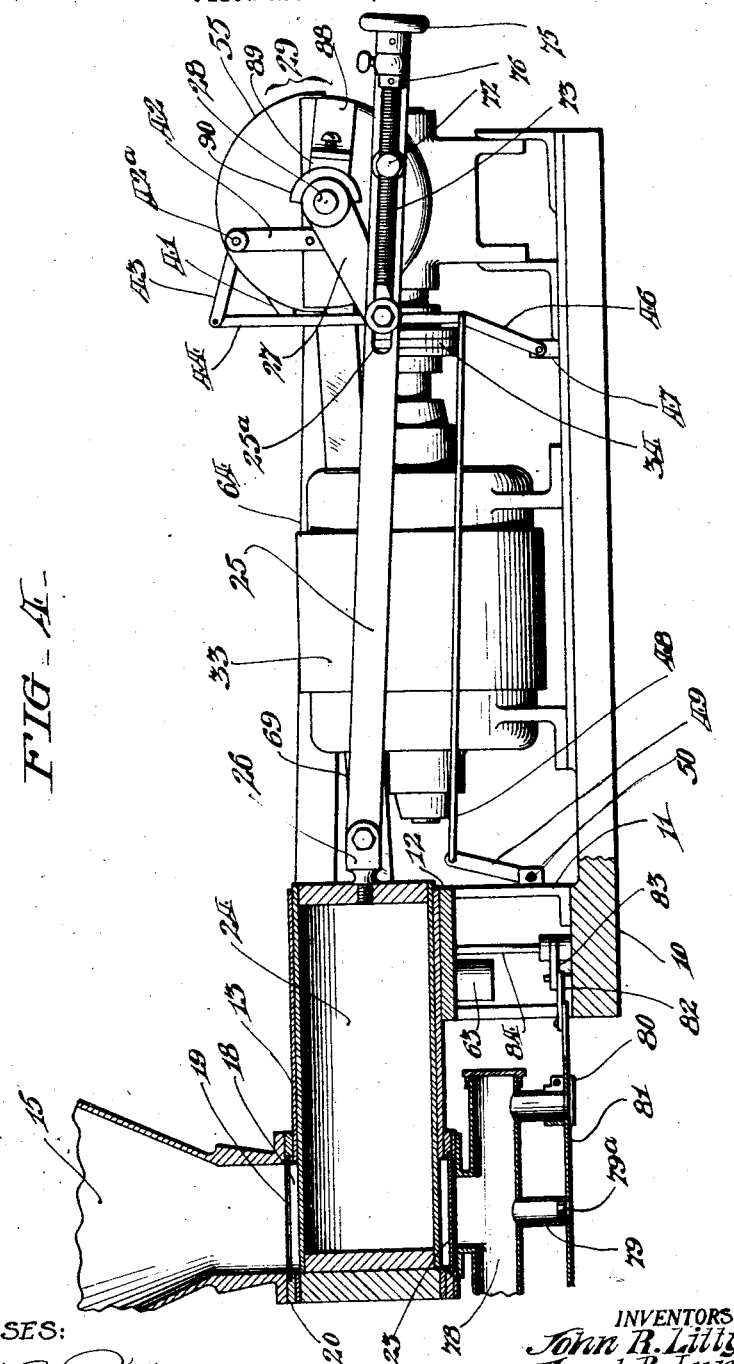
WITNESSES:
INVENTORS:
John R. Litty &
Trued B. Lundin,
BY
ATTORNEY.

Oct. 16, 1928.
J. R. LITTY ET AL
1,687,944
FILLING MACHINE
Filed March 19, 1927
6 Sheets-Sheet 5
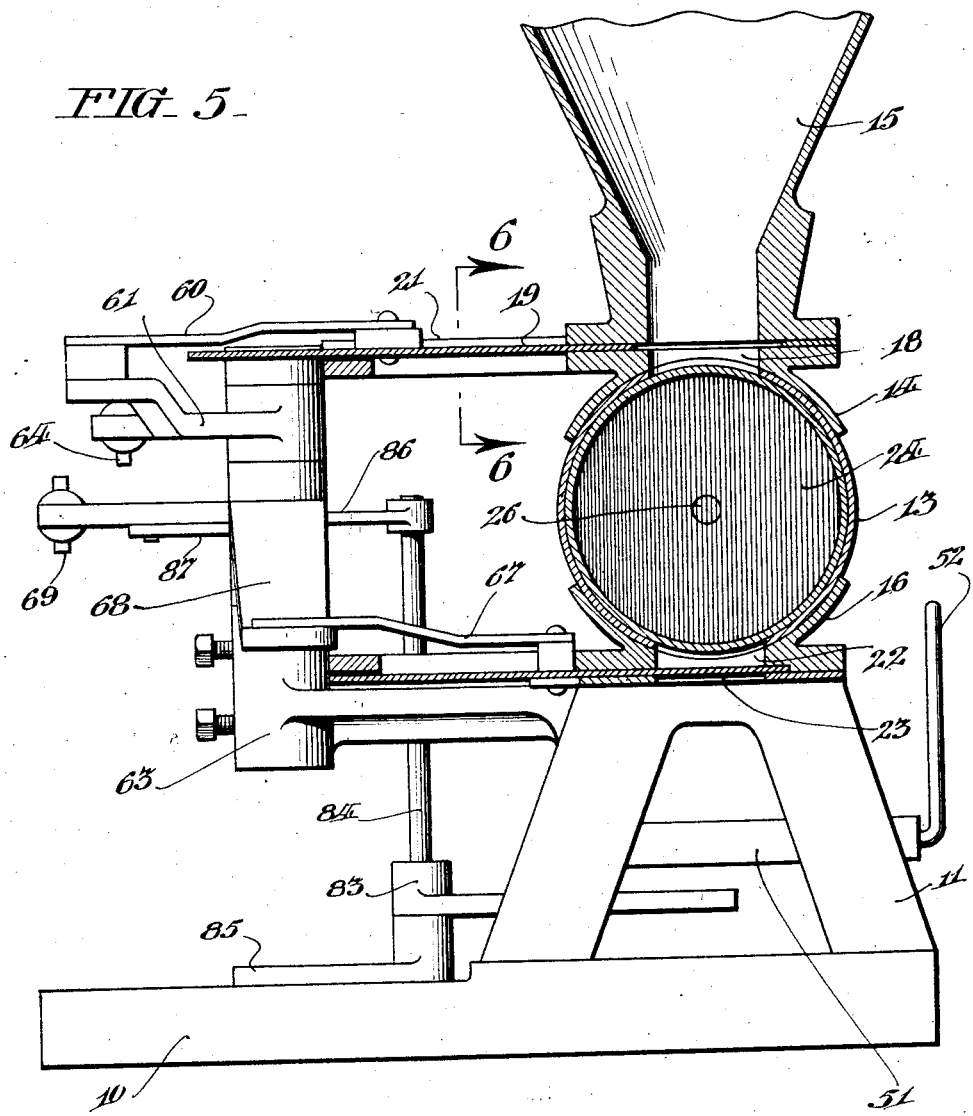

Oct. 16, 1928.

J. R. LITTY ET AL 1,687,944

FILLING MACHINE

Filed March 19, 1927 6 Sheets-Sheet 6

WITNESSES:
Alfred E. Oschinger
Wesley Merrill

INVENTORS:
John R. Litty &
Trued B. Lundin,
BY
Joshua R. H. Toth
ATTORNEY.

Patented Oct. 16, 1928.

1,687,944

UNITED STATES PATENT OFFICE.

JOHN R. LITTY AND TRUED B. LUNDIN, OF PHILADELPHIA, PENNSYLVANIA.

FILLING MACHINE.

Application filed March 19, 1927. Serial No. 176,671.

Our invention relates to measuring machines and more particularly to a machine adapted to automatically deliver desired quantities of semi-liquid materials, such as cake batter, dough, jams, jellies, and the like.

On account of the keen competition which the present day baker must meet, it is necessary that he be able to measure cake batter and other mixtures in exact quantities so that the finished product will be of a uniform size and to prevent any unnecessary waste. This measuring must be done quickly and economically and the measuring device must be so constructed that it may be easily cleaned and kept in a sanitary condition.

The principal object of our invention is to provide a machine which will quickly and accurately measure semi-liquid and other substances into given quantities and which is so constructed that it may be readily cleaned.

Another object of our invention is to provide a machine having means whereby it may be quickly adjusted to accurately deliver a definite quantity of material.

Another object of our invention is to provide a machine in which the delivery port will be closed when the machine is stopped in order that material will not escape from the measuring chamber while the machine is not in operation.

Another object of our invention is to so construct the machine that attachments may be added thereto for sub-dividing a measured quantity of material into a plurality of smaller lots.

Still another object of our invention is to provide a machine having a large capacity but which is so compactly constructed that it will occupy but a small amount of bench or floor space.

These objects, and other advantageous ends which will be described hereinafter, we attain in the following manner, reference being had to the accompanying drawings in which Figure 1 is an end view of a machine embodying our invention, and Figure 2 a top plan view thereof but with the hopper omitted.

Figure 4 is a view, partly in section, taken on line 4—4 on Figure 2, but showing a fragment of the hopper and a certain attachment in position.

Figure 5 is a cross-sectional view, taken on the line 5—5 on Figure 2 but showing a fragment of the hopper in position, and Figure 6 a sectional view taken on line 6—6 on Figure 5, showing the upper cut-off and its bearings only.

Figure 1:
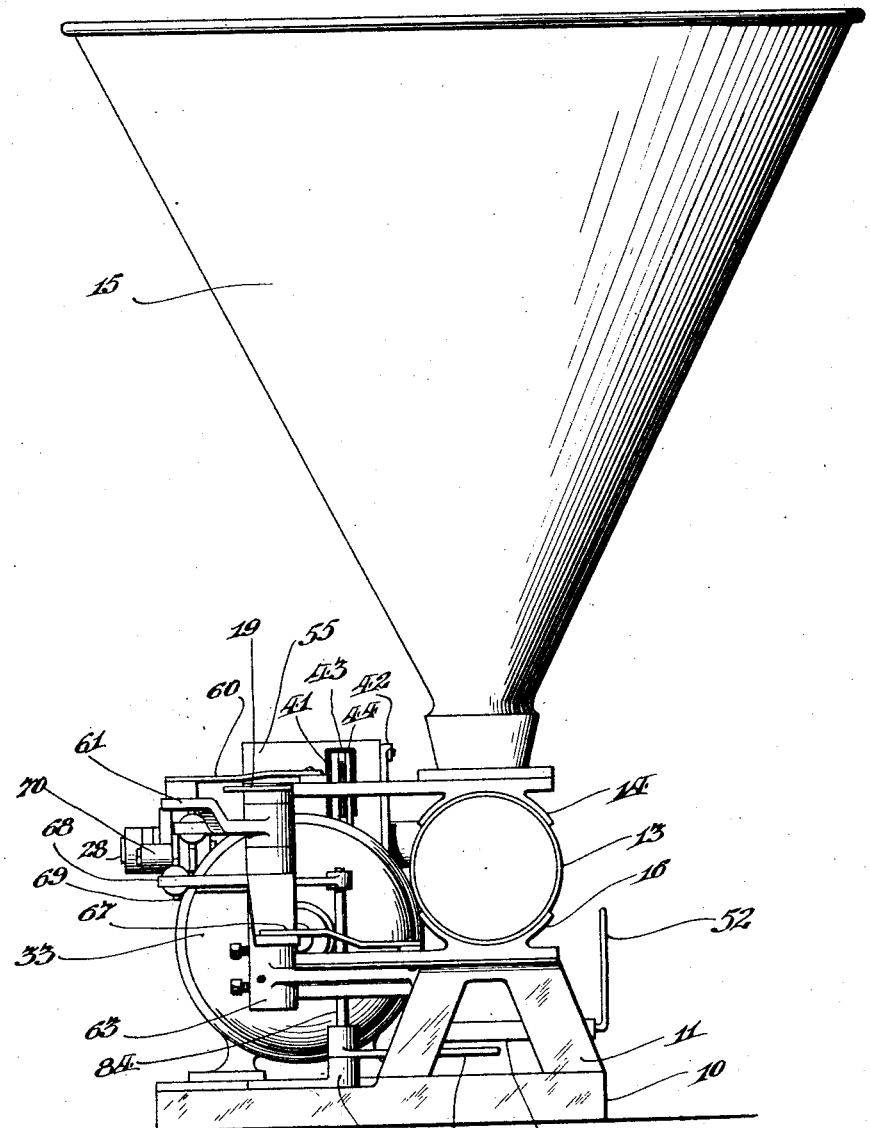

Referring now more in detail to the drawings, the machine has a base 10 on one end of which is mounted a pedestal 11 having a cylinder support 12 fixed to its upper end and supporting a cylinder 13 which extends horizontally therefrom. On the upper side of the outer end of cylinder 13, is mounted a hopper support 14 to which a hopper 15 is detachably secured. On the under side of the outer end of cylinder 13, a valve casting 16 is rigidly secured and adapted to support an attachment 17, which will be later described herein and more fully described and claimed in our co-pending application for attachment for measuring machines, Serial No. 176,672, filed March 19, 1927.

Figure 2:
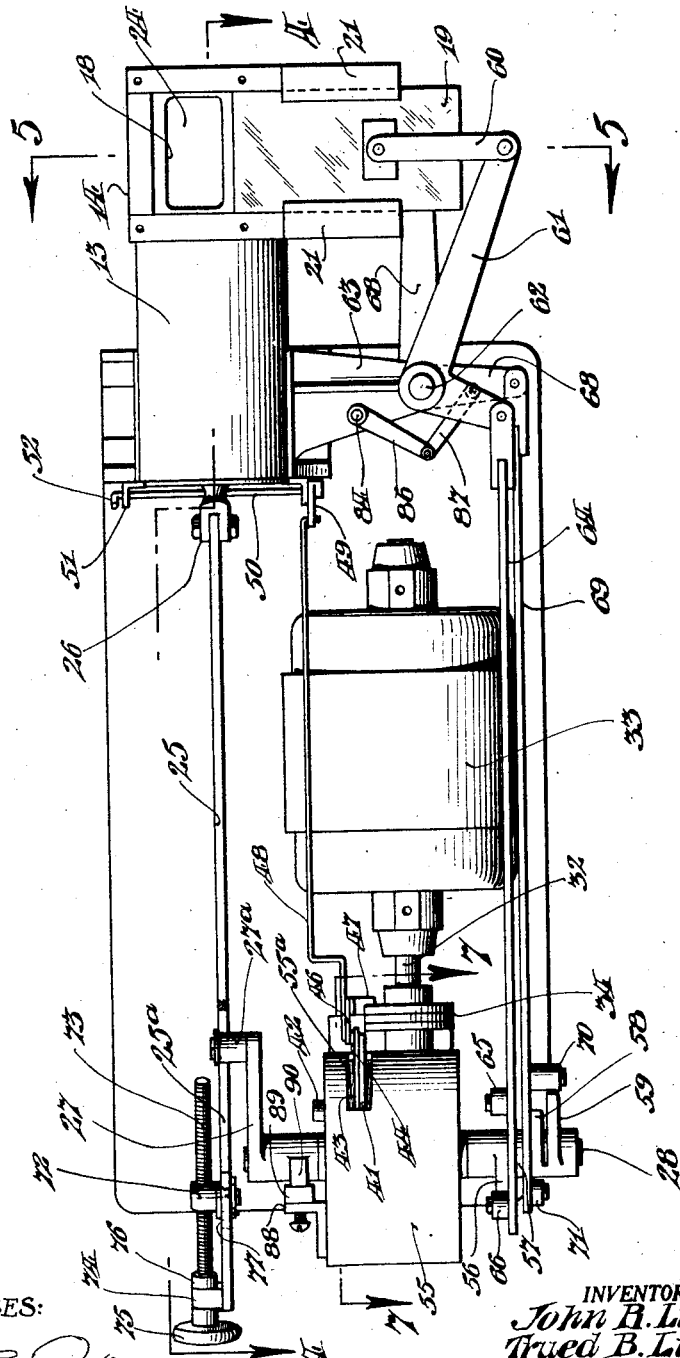
Figure 3:
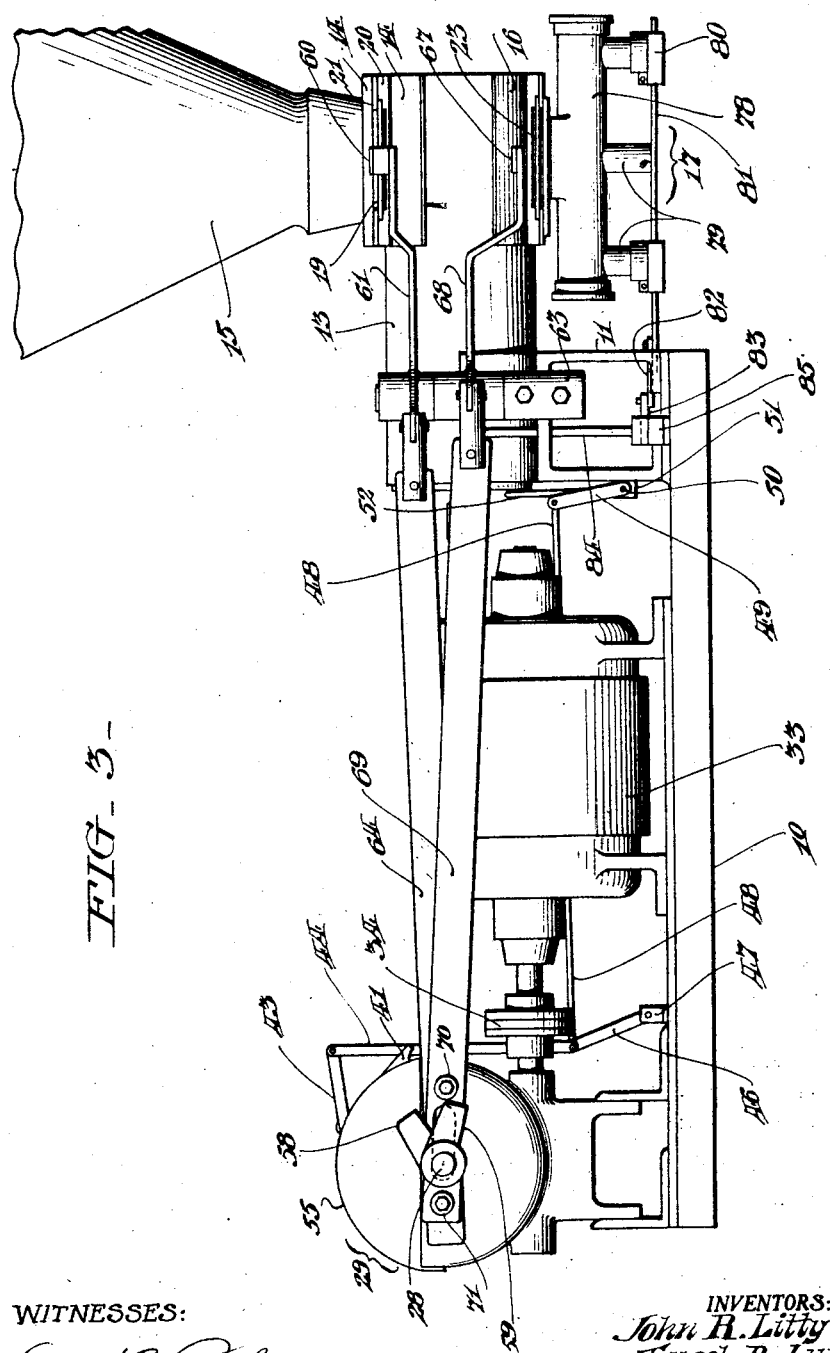
Figure 3 is a front view, looking from the left, of the machine shown in Figure 1 but showing a certain attachment in position and with the hopper partly broken away.

Hopper 15 communicates with the interior of cylinder 13 through a port 18 formed in hopper support 14. A valve slide 19, adapted to close port 18, is mounted in guideways 20 formed in hopper support 14 and is held against vertical movement by means of guide plates 21 secured to hopper support 14, as plainly shown in Figures 2 and 6. The material to be measured is adapted to pass out of cylinder 13 through a port 22 formed in valve casting 16 and which is adapted to be closed by a valve slide 23 suitably mounted in valve casting 16 and guided in a manner similar to valve slide 19.

A piston 24 is slidably fitted in cylinder 13 and is moved longitudinally thereof by means of a piston rod 25 pivotally connected in a bifurcated bearing 26 secured to one end of piston 24. A crank 27, keyed to a shaft 28 which is rotatably mounted in a housing 29, is provided at its outer end with a roller 27ª which extends through an elongated slot 25ª, formed longitudinally in piston rod 25, and which is slidably held therein as by means of a suitable washer and tap bolt.

Within housing 29, a worm wheel 30 is rotatably mounted on shaft 28 and is adapted to be rotated by a worm 31 fixed on a worm shaft 32 which is connected to a motor 33 by means of a flexible joint 34.

Figure 7:
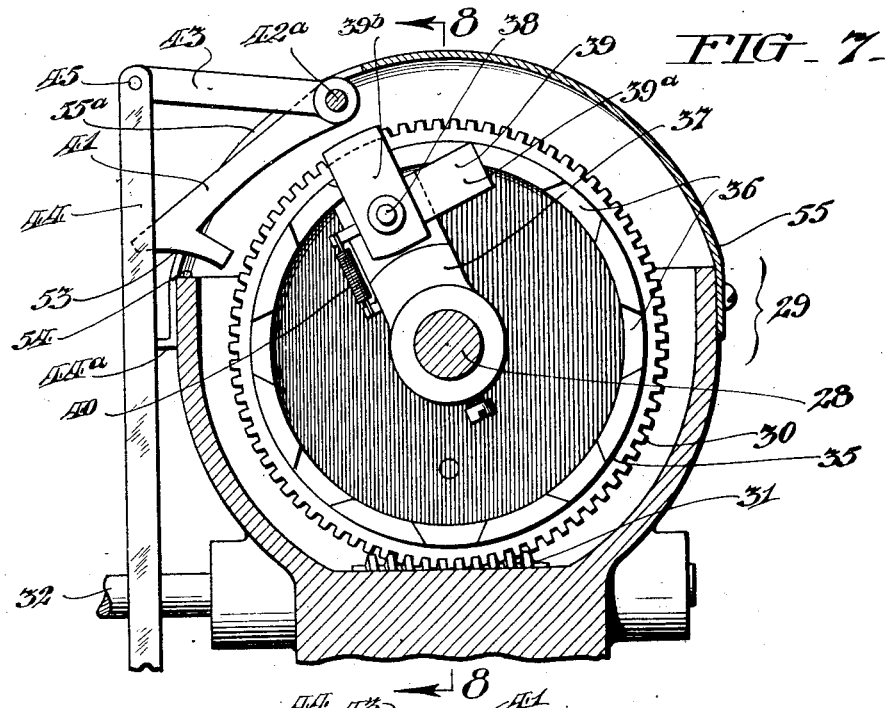
Figure 7 is a fragmentary sectional view, taken substantially on line 7—7 on Figure 2, and Figure 8 a cross-sectional view, taken on line 8—8 on Figure 7.
Figure 8:
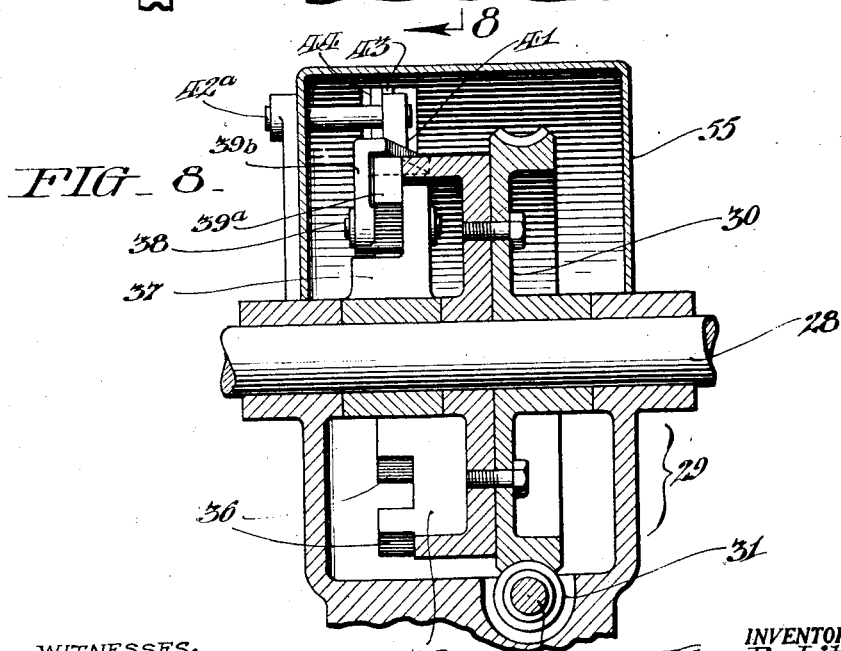

An open-ended drum 35, rotatable on shaft 28, is bolted to worm wheel 30 and has a series of notches 36 formed in its edge, as shown in Figures 7 and 8. An arm 37, rigidly secured to shaft 28, has a pin 38 fixed near its outer end on which a dog 39 is rockably mounted and which is held in operating position, as shown in Figure 7, by a coiled spring 40 having its ends suitably secured to dog 39 and arm 37 respectively. In its operative position, dog 39 has one leg $39^a$ engaging notches 36 while its other leg $39^b$ extends beyond the face of drum 35 and is bent over the edge of the drum so that it may be engaged by a trip 41 pivoted to a support 42 by means of a pin $42^a$.

An arm 43, also rotatably mounted on pin $42^a$, is rigidly secured to or formed integral with trip 41 and has its outer end pivotally connected to a link 44 by means of a pin 45. A link 46 has one end pivotally mounted in a bracket bearing 47 and its other end pivotally connected to the lower end of link 44 and to one end of a rod 48. The other end of rod 48 is pivotally connected to an arm 49 rigidly connected to a shaft 50 which is rotatable in bearings 51 and which has its other end turned upwardly to form a handle 52.

When handle 52 is in a vertical position, the outer end of arm 43 will be raised and consequently hold trip 41 away from drum 35. When handle 52 is turned downwardly, the vertical distance between bracket bearing 47 and pin 45 is shortened which consequently allows trip 41 to move inwardly and engage leg $39^b$ and hold same against rotation, thus moving leg $39^a$ out of notch 36. As worm wheel 30 and drum 35 are loose on shaft 28, they may be rotated by worm 31 while shaft 28 remains stationary and consequently piston 24 will cease to move in cylinder 13. Trip 41 is prevented from moving inwardly far enough to actually engage the surface of drum 35 by a face 53, formed on the head of trip 41, engaging a shoulder 54 formed on housing 29. Trip 41 is prevented from moving outwardly more than a predetermined distance by link 44 abutting a stop $44^a$ secured to housing 29. The upper half of housing 29 consists of a cover 55 which has formed therein a slot $55^a$ to allow the entrance of arm 43 and trip 41.

A cam 56 is secured to shaft 28 adjacent housing 29, a spacer 57 is spaced from cam 56 and cams 58 and 59 are fixed to the outer end of the shaft: A link 60 has one end pivoted to valve slide 19 and its other end pivoted to one arm of a bell crank 61 rockably mounted on a shaft 62 secured in a bracket 63 formed on or attached to pedestal 11. A connecting rod 64 has one end pivotally connected to the other arm of bell crank 61 while its other end is slotted and straddles shaft 28 between cam 56 and spacer 57. Rollers 65 and 66 are secured to the side of connecting rod 64 adjacent cam 56 and are disposed at either end of the slot formed in this end. As shaft 28 rotates, cam 56 will engage roller 65 and move connecting rod 64 forwardly and actuate bell crank 61 so that port 18 is closed by valve slide 19. As shaft 28 continues to rotate, cam 56 will engage roller 66 and rock bell crank 61 in the opposite direction and draw valve slide 19 from over port 18.

A link 67 has one end pivotally connected to valve slide 23 and its other end pivotally connected to one arm of a bell crank 68 rockably mounted on shaft 62. A connecting rod 69 has one end pivotally connected to the other arm of bell crank 68 while its other end is slotted and straddles shaft 28 between spacer 57 and cam 58. A roller 70 is connected to the side of connecting rod 69 near the forward end of this slot and a roller 71 is similarly connected near the rear end of this slot. As shaft 28 rotates, cam 59 will engage roller 70 and force connecting rod 69 forwardly and actuate bell crank 68 so as to cause valve slide 23 to cover port 22. As shaft 28 continues to rotate, cam 58 will engage roller 71 and draw connecting rod 69 rearwardly and cause bell crank 68 to draw valve slide 23 away from port 22.

Cams 56, 58 and 59 are so timed that port 18 will be open at the time when piston 24 starts to move rearwardly, thus allowing the material in hopper 15 to pass into cylinder 13 by means of its own weight and by the suction caused by the movement of piston 24 in cylinder 13. When piston 24 reaches the end of its rearward stroke, valve slide 19 closes port 18 and port 22 is opened. Piston 24 moves forwardly and forces the contents of cylinder 13 through port 22 into pans or receptacles either placed there by hand or fed thereunder automatically as may be desired.

If piston 24 is allowed to make a full stroke, it follows that a quantity of material will be measured by the machine equal to the cubical contents of that portion of cylinder 13 unoccupied by the piston. When a smaller quantity of material is desired, the stroke of piston 24 is shortened by means of a bearing 72 slidably mounted in slot $25^a$ and held in adjusted positions by a screw 73 threaded through bearing 72 and rotatably mounted in a bearing 74 on the end of piston rod 25. Screw 73 is provided at its outer end with a hand wheel 75 and is held against longitudinal movement through bearing 74 by means of the hub of hand wheel 75 and a collar 76 abutting either side of the bearing.

As shaft 28 rotates, roller $27^a$ will engage the forward end of slot $25^a$ and move connecting rod 25 and piston 24 forwardly until piston rod 25 and crank 27 are substantially in alignment, at which time the head of piston 24 is in close proximity to the head of cylinder 13. As shaft 28 continues to rotate, roller 27ª will move rearwardly in slot 25ª until it bears against bearing 72 when it moves piston rod 25 and piston 24 rearwardly. It is evident that, if bearing 72 is moved to its forwardmost position on screw 73, piston 24 will make a full stroke and the maximum quantity of material will be delivered from cylinder 13, and that moving bearing 72 rearwardly will shorten the stroke and cause the machine to deliver a smaller quantity of material. Setting the machine to deliver different quantities is facilitated by a scale 77 placed on the upper edge of piston rod 25 adjacent slot 25ª and having its divisions designated in any desired manner as in pints and fractions thereof.

The throw of crank 27 and the length of slot 25ª are such that roller 27ª travels some distance longitudinally of slot 25ª even when piston 24 makes a full stroke. When piston 24 is in its forwardmost position, as shown in Figure 4, and roller 27ª starts to move rearwardly in slot 25ª, cam 59 engages roller 70 and causes valve slide 23 to close port 22. Immediately thereafter, cam 56 engages roller 66 and causes port 18 to open. The drawings show the positions of the various parts just after port 22 has been opened. From the position shown, roller 27ª swings rearwardly until it meets bearing 72 which it engages and moves piston 24 rearwardly to the end of its stroke and then moves forwardly in slot 25ª while cam 56 engages roller 65 and closes port 18; after which cam 58 engages roller 71 and opens port 18. Roller 27ª then moves forwardly until it engages the front end of slot 25ª and moves piston 24 forwardly.

Sometimes it is desirable to sub-divide the quantity measured by the machine into a plurality of smaller lots and, to accomplish this result, we provide the attachment 17 which consists of a cylinder 78 connected to cylinder support 12 and having an opening communicating with port 22. A plurality of tubes 79 extend downwardly and terminate in valve seats 80 in which a valve slide 81 is slidable. It is evident that, after piston 24 has forced cylinder 78 full of the material being measured, a quantity equal to each charge delivered from cylinder 13 will be divided into as many parts as there are tubes 79 attached to cylinder 78.

As the tube or tubes nearest the inlet to cylinder 78 are inclined to deliver a greater amount of material than those farther away, we provide reduction rings 79ª of different thicknesses, one of the desired thickness being inserted in the end of the tube or tubes nearest the inlet. The thickness of the ring 79ª required depends on the consistency of the material being measured. This feature, together with the structure of attachment 17, is more fully described and claimed in our co-pending application.

In order to actuate valve slide 81, a link 82 has one end pivoted to the valve slide and its other end pivoted to a lever 83 fixed to a shaft 84 which is mounted in a bearing 85 fixed to base 10. A lever 86 has one end fixed to shaft 84 and its other end pivotally connected to one end of a link 87; the other end of which is pivotally connected to one arm of bell crank 68. As bell crank 68 operates valve slide 23, and, as lever 83 is mechanically connected to bell crank 68, it is evident that valve slides 23 and 81 will open and close in unison.

In using the machine, the material to be measured is placed in the hopper 15 and power supplied to motor 33 which will rotate worm 31 and worm wheel 30. Handle 50 is then placed in the position shown in the drawings which will remove trip 41 from contacting with leg 39ᵇ and allow leg 39ª to engage a notch 36 and cause arm 37, to which dog 39 is secured, to rotate shaft 28. This will rotate crank 27 and, assuming that valve slide 23 is in closed position, will draw piston 24 rearwardly and cause the material in hopper 15 to fill that portion of cylinder 13 not occupied by piston 24. As shaft 28 continues to rotate, cam 56 will engage roller 65 and cause valve slide 19 to close port 18 and cam 58 will engage roller 71 and cause valve slide 23 to uncover port 22. Roller 27ª then engages the forward end of slot 25ª and moves piston 24 forwardly, thus forcing the contents of cylinder 13 through port 22. This cycle of operation is continued without attention from the operator with the exception of keeping a supply of material in hopper 15 and attending to the placing of pans or receptacles in position to be filled and removing them.

Whenever it is desired to stop the machine for any reason, handle 52 is turned downwardly which will cause trip 41 to engage leg 39ᵇ and withdraw leg 39ª from notch 36, thus stopping rotation of shaft 28. It will be noted, however, that trip 41 can only engage leg 39ᵇ at one point in the cycle of operation and this point corresponds to the point at which valve slide 23 is in closed position over port 22, consequently no material can escape from cylinder 13.

At this point in the cycle of operation, piston 24 is in its forwardmost position and consequently crank 27 extends forwardly from shaft 28 and must support the weight of connecting rod 25 on its outer end. This weight tends to move the end of crank 27 downwardly and turn shaft 28 so that the different movements would not be in time. To overcome this tendency, we provide a bracket 88 on housing 29 and mount thereon a friction piece 89 which is adapted to make contact with a semi-circular member 90 secured to, or formed on, the hub of crank 27. Friction piece 89 is adapted to provide the correct amount of friction between member 90 and itself by means of suitable set screws and, when so desired, springs may be inserted between it and bracket 88.

The operation of the machine has been described in conjunction with the handling of cake batter and the like, but it is also used in filling receptales with jams, jellies and other products produced by the preserve manufacturer. The machine is designed to handle any semiliquid material and will also handle granular material.

The above described machine is capable of delivering a greater number of measured quantities of material in a given time than any other machine on the market, although it occupies but a small amount of bench or floor space relatively to such other machines. It is simple in construction and requires a minimum of power for its operation and, due to its construction, it is easily kept in a sanitary condition.

While we have described a preferred embodiment of our invention it will be readily understood that certain modifications might be made without departing from the spirit thereof, and hence we do not limit ourselves to the precise construction set forth, but consider that we are at liberty to make such changes and alterations as fairly come within the scope of the appended claims.

Having thus described our invention, what we claim as new and desire to secure by Letters Patent is:—

1. A measuring machine including a frame; a measuring cylinder mounted thereon; a piston movable in the cylinder; a shaft rotatable in the frame and mechanically connected to the piston; means for actuating the shaft; a member rotatable upon the shaft and having notches; means for imparting rotation thereto; an arm fixed to the shaft, a dog mounted on the arm and adapted to engage the notches, a trip adapted to engage the dog and move it out of engaging position, and means for actuating the trip.

2. A measuring machine including a frame; a cylinder mounted in the frame and having an inlet and an outlet; a shaft rotatable in the frame and mechanically connected with the piston; means for actuating the shaft; a member having notches in its periphery and rotatably mounted on the shaft; means for imparting rotation thereto; an arm fixed to the shaft; a dog mounted on the arm and adapted to engage the notches; cams on the shaft; mechanism connected to the valve member arranged to be actuated by the cam, and means for disengaging the dog from the notches when the valve member is in closed position.

3. A measuring machine including a frame; a cylinder, having an inlet and an outlet, mounted in the frame; a valve member for closing the outlet; a piston movable in the cylinder; a shaft rotatable in the frame and mechanically connected to the piston; means for actuating the shaft; a member having notches in its periphery and rotatably mounted on the shaft; an arm fixed to the shaft; a dog mounted on the arm and normally engaging a notch; cams on the shaft; mechanisms connected to the valve member and arranged to be actuated by the cams; a trip hinged to the frame adapted to engage the dog and move it out of notch engaging position, the trip being so positioned that it may engage the dog only when the valve member is in closed position, and means for actuating the trip.

4. A measuring machine including a frame; a measuring cylinder mounted in the frame; a piston movable in the cylinder; a shaft rotatable in the frame and mechanically connected to the piston; a worm wheel rotatable on the shaft; an extension on the worm wheel having notches formed therein; an arm fixed to the shaft; a dog mounted on the arm and adapted to engage the notches; a trip adapted to engage the dog and move it out of notch engaging position, and means for rotating the worm wheel.

5. A measuring machine including a frame; a measuring cylinder mounted in the frame; a piston movable in the cylinder; a shaft rotatable in the frame and mechanically connected to the piston; a worm wheel rotatable on the shaft; an open ended cylinder, having notches formed around its edge, rotatable on the shaft and secured to the worm wheel; an arm fixed to the shaft; a dog mounted on the arm and adapted to engage the notches; a trip adapted to engage the dog and move it out of notch engaging position, and means for rotating the worm wheel.

6. A measuring machine including a frame; a measuring cylinder mounted in the frame; a piston movable in the cylinder; a shaft rotatable in the frame and mechanically connected to the piston; a worm wheel rotatable on the shaft; an extension on the worm wheel having notches formed therein; an arm fixed to the shaft; a dog mounted on the arm and adapted to engage the notches; a spring tending to hold the dog in notch engaging position; a trip hinged to the frame and adapted to engage the dog for moving same out of notch engaging position; and means for rotating the worm wheel.

7. A measuring machine including a frame; a measuring cylinder mounted in the frame; a piston movable in the cylinder; a shaft rotatable in the frame and mechanically connected to the piston; a worm wheel rotatable on the shaft; an extension on the worm wheel having notches formed therein; an arm fixed to the shaft; a dog mounted on the arm and adapted to engage the notches; a spring tending to hold the dog in notch engaging position; a trip hinged to the frame and adapted to engage the dog for moving same out of notch engaging position; means for rotating the worm wheel; and means tending to hold the shaft against rotation when disengaged from the worm wheel.

8. A measuring machine including a frame; a measuring cylinder mounted in the frame; a piston movable in the cylinder; a shaft rotatable in the frame and mechanically connected to the piston; a worm wheel rotatable on the shaft; an extension on the worm wheel having notches formed therein; an arm fixed to the shaft; a dog mounted on the arm and adapted to engage notches; a spring tending to hold the dog in notch engaging position; a trip hinged to the frame and adapted to engage the dog for moving same out of notch engaging position; a friction member on the shaft; a friction piece engaging the friction member for holding the shaft against rotation when disengaged from the worm wheel; and means for rotating the worm wheel.

9. A measuring machine including a frame; a measuring cylinder mounted in the frame; a piston movable in the cylinder; a shaft rotatable in the frame and mechanically connected to the piston; a worm wheel rotatable on the shaft; an extension on the worm wheel having notches formed therein; an arm fixed to the shaft; a dog mounted on the arm and adapted to engage the notches; a spring tending to hold the dog in notch engaging position; a trip hinged to the frame and adapted to engage the dog for moving same out of notch engaging position; means for limiting the movement of the trip; and means for rotating the worm wheel.

10. A measuring machine including a frame; a cylinder, having an inlet and an outlet, mounted in the frame; a valve member for closing the outlet; a piston movable in the cylinder; a shaft rotatable in the frame and mechanically connected to the piston; a worm wheel rotatable on the shaft; an extension on the worm wheel having notches formed therein; an arm fixed to the shaft; a dog mounted on the arm and adapted to engage the notches; cams on the shaft; mechanism connected to the valve member and arranged to be actuated by the cams; means for disengaging the dog from the notches when the valve member is in closed position; and means for rotating the worm wheel.

11. A measuring machine including a frame; a cylinder, having an inlet and an outlet, mounted in the frame; a valve member for closing the outlet; a piston movable in the cylinder; a shaft rotatable in the frame and mechanically connected to the piston; a worm wheel rotatable on the shaft; an extension on the worm wheel having notches formed therein; an arm fixed to the shaft; a dog mounted on the arm and adapted to engage the notches; a spring tending to hold the dog in notch engaging position; cams on the shaft; mechanism connected to the valve member and arranged to be actuated by the cams; a trip hinged to the frame and adapted to engage the dog for moving same out of notch engaging position; the trip being so positioned that it may engage the dog only when the valve member is in closed position; and means for rotating the worm wheel.

12. A machine for measuring material into predetermined quantities including a measuring receptacle having an outlet; a displacement member movable in the receptacle; an attachment, for sub-dividing a measured quantity into smaller lots and having a plurality of outlets, communicating with the outlet from the receptacle; valve members adapted to close the outlet from the measuring receptacle and the outlet from the attachment; means for moving the valve members in unison; and means for moving the displacement member.

13. In a machine of the character described having a measuring chamber with an outlet therefrom, a valve member for closing the outlet, a bell crank for operating the valve member, an attachment in alignment with the outlet, and a valve slide in the attachment; means for operating the valve slide including a shaft; a lever fixed to the shaft and connected to the slide; a link connected to the bell crank; and a lever fixed to the shaft and connected to the link.

In testimony whereof we have signed our names to this specification.

JOHN R. LITTY.
TRUED B. LUNDIN.